United States Patent [19]
Khmelev et al.

[11] 4,212,677
[45] Jul. 15, 1980

[54] MOLDING SAND MIXTURE FOR THE MANUFACTURE OF MOLDS AND CORES

[76] Inventors: Jury G. Khmelev, ulitsa Barrikadnaya, 19, kv. 87; Gennady P. Kim, ulitsa Marshala Eremenko, 53, kv. 32, both of Volgograd; Dmitry Y. Zhinkin, ulitsa 5 Parkovaya, 56, korpus 6, kv. 51; Solomanida I. Kleschevnikova, ulitsa Bazhova, 15, korpus 1, kv. 22, both of Moscow, all of U.S.S.R.

[21] Appl. No.: 954,575

[22] Filed: Oct. 25, 1978

[51] Int. Cl.$^2$ .............................................. B28B 7/34
[52] U.S. Cl. ............................ 106/38.35; 106/38.2; 106/38.3; 106/287.11; 106/287.14; 106/287.16
[58] Field of Search ................ 106/38.2, 38.3, 38.35, 106/287.11, 287.14, 287.16

[56] References Cited
U.S. PATENT DOCUMENTS
4,080,214  3/1978  Wichelm .......................... 106/38.3

*Primary Examiner*—Lorenzo B. Hayes
*Attorney, Agent, or Firm*—Steinberg & Blake

[57] ABSTRACT

A molding sand mixture containing a filler, a binder in the form of a solution of hydrolyzed ethylsilicate and a curing agent; as the latter use is made of an organic solution of a polyorganosilazane of the formula:

$$\{(R_2SiNH)_n [R'Si(NH)_{1,5}]_m\}_k,$$

wherein R is $CH_3$, R' is $CH_3$ or $C_6H_5$, n=1, k=4–10, m=1–3.

The components are taken in the following proportions in percent by weight:

| | |
|---|---|
| solution of hydrolyzed ethylsilicate | 10 to 35 |
| organic solution of polyorganosilazane | 0.2 to 2.0 |
| filler | the balance. |

The curing agent according to the present invention gives a high quality of the surface finish of the final castings.

3 Claims, 2 Drawing Figures

MOLDING SAND MIXTURE FOR THE MANUFACTURE OF MOLDS AND CORES

The present invention relates to the foundry art and, more particularly, to a molding sand mixture for the manufacture of molds and cores; most advantageously it may be used for the production of precision castings with a high surface finish, though it may be also used for other types of casting.

During the recent two decades there has come into wide use molding sand mixtures which insure a high quality in the production of special-purpose castings. Generally, such molding sand mixture incorporates a filler, a binder and a curing agent. The molding sand mixture composition and proportions of its ingredients are selected depending on the casting requirements. In the case where use is made of a liquid (pourable) molding sand mixture, use is made of such well known materials as quartz, distensilimanite, alumina, zirconium silicate and the like as fillers. As the binder, in the same case, use is made of a solution of hydrolyzed ethylsilicate, while as the curing agent for the liquid mixture use is made of a wide range of different agents such as solutions of alkalis, polyethylenepolyamine, triethanolamine, hexamethylenetetramine, aqueous solutions of ammonia and the like.

Thus, known in the art is a molding sand mixture containing the following components taken in proportions specified hereinbelow in percent by weight:

| | |
|---|---|
| dry filler | 79–90 |
| solution of hydrolyzed ethylsilicate | 9–18 |
| 30–100% solution of triethanolamine N(CH$_2$CH$_2$OH)$_3$ | 0.3–5 |

(cf. USSR Inventor's Certificate No. 363545).

Into an aqueous or acetone solution of triethanolamine there may be incorporated up to 25–28% of ammonia to increase activity of the curing agent. The process of curing of the molding sand mixture is caused by gelling of ethylsilicate according to the following scheme:

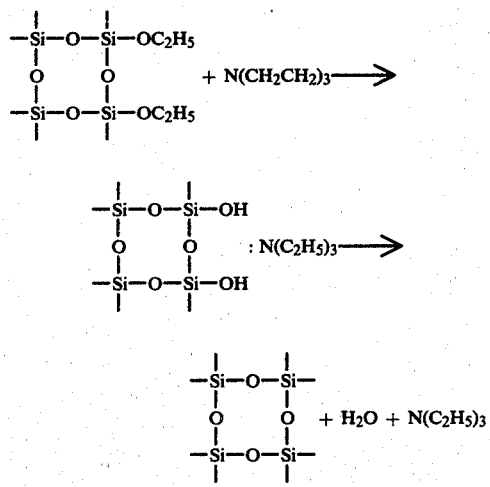

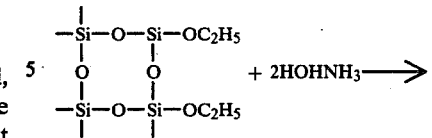

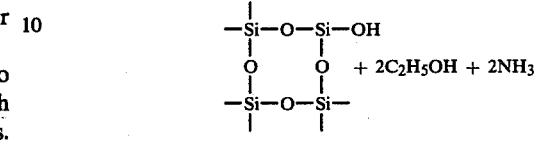

The use of the above-mentioned curing agents, however, brings about the following disadvantages of the prior art molding sand mixtures, namely:

process of hardening starts directly from the moment of contact with the curing agent which causes aggregation of particles of the molding sand mixture or non-uniformity of setting thereof over its volume due to a hindered distribution of the curing agent uniformly over the whole bulk of the mixture. This, in turn, causes cracking and impaired quality of the surface of the final mold or core. Furthermore, as a consequence, mechanical strength of the final mold is reduced;

known curing agents, especially those in the form of aqueous solutions, comprise "ballast" in the structure of the molding sand mixture, i.e. compounds taking no part in the formation of molecular siloxane bonds which, in turn, additionally lowers mechanical strength of the cured sand mixture. Therefore, mechanical strength of the prior art molding sand mixtures usually does not exceed 15 kg/cm$^2$ in bending tests.

It should be noted that the above-mentioned curing agents possess rather high toxicity which makes handling thereof quite dangerous. Finally, owing to a high reactivity or so-called "rigidity", a very precise dosage of said curing agents is required which complicates the production process; the necessity of drying or calcining of fillers for the removal of a so-called "ballast humidity" therefrom results in a reduced mechanical strength.

It is an object of the present invention to provide an even, with time, and a uniform, in volume, curing of the molding sand mixture and an increased mechanical strength thereof after hardening.

It is another object of the present invention to improve labour conditions for the personnel by minimizing toxicity.

It is still another object of the present invention to improve quality of the surface of the final castings.

It is a further object of the invention to eliminate drying or calcination of fillers for the removal of humidity.

Still a further object of the present invention is to improve environment protection conditions.

These and other objects are accomplished in a molding sand mixture for the manufacture of molds and cores which contain a filler, a binder in the form of a solution of hydrolyzed ethylsilicate and a curing agent causing gelling of ethylsilicate. In accordance with the present invention as the curing agent use is made of an organic solution of a polyorganosilazane of the formula:

$$\{(R_2SiNH)_n[R'Si(NH)_{1,5}]_m\}_k,$$

wherein R is CH₃, R' is CH₃ or C₆H₅; n=1, k=4 to 10, m=1 to 3, the ingredients being contained in the following proportions, percent by weight:

| | |
|---|---|
| solution of hydrolyzed ethylsilicate | 10 to 35 |
| solution of the polyorganosilazane of the above formula | 0.10 to 2.00 |
| filler | the balance. |

The use of a polyorganosilazane is based on two reactions successively occurring in the molding sand mixture.

First of all, due to instability of the bond ≡Si—N≡ there occurs hydrolysis of this curing agent with the formation of siloxane bonds:

 (3)

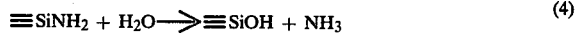 (4)

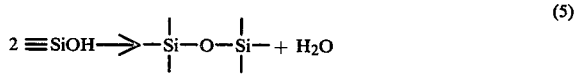 (5)

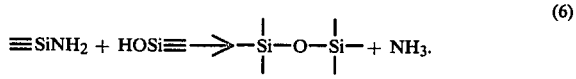 (6)

In said hydrolysis of the polyorganosilazane in the medium of hydrolyzed ethylsilicate there is consumed the coordination-bound and adsorbed humidity of the filler which constitutes one of the advantages of the novel curing agent according to the present invention which makes it possible to use previously harmful "ballast" humidity for the formation of additional siloxane bonds and increase of adhesion.

Secondly, ammonia formed at the surface of the filler particles according to reactions 4 and 6 facilitates the formation of siloxane bonds (i.e. gelling of ethylsilicate) according to reaction 2 mentioned hereinbefore.

Therefore, in contrast to the prior art curing agents polyorganosilazane, being less toxic, acts as a binder, as well as a curing agent for hydrolyzed ethylsilicate and as an agent removing so-called "ballast" water.

Bending strength of the cured molding sand mixture produced with the use of a polyorganosilazane is a high as 20 to 25 kg/cm² which is by 1.5-1.75 times higher than that of a molding sand mixture produced with the use of triethanolamine. Due to the fact that said reactions involve two stages, it is possible to uniformly distribute polyorganosilazane over the molding sand mixture volume to ensure even and uniform hardening of the molding sand mixture while eliminating agglomeration and cracking and to increase mechanical strength.

As the solvents for the polyorganosilazane use may be made of toluene, benzene, kerosene and other hydrocarbons.

The above-specified limits of the content of hydrolized ethylsilicate solution in the mixture are due to the fact that when it is present in an amount of below 10% by weight the mixture lacks plasticity (it gets thick) and cannot be poured into the model; with the content of ethylsilicate of above 35% by weight the mixture has a too high fluidity and sedimentation of the filler occurs therein; after curing a network of cracks appears on the surface of the final molds and cores which impairs quality of the surface and lowers mechanical strength.

The above-specified range of content of polyorganosilazane is selected due to the fact that with its content of below 0.1% by weight the time required for hardening of the molding sand mixture is increased so that segregation (sedimentation) of the ingredients occurs which results in the production of defective molds. When a polyorganosilazane is present in an amount exceeding 2.00% by weight, the curing time or life time of the molding sand mixture is shortened to 0.5 minute and less, wherefore the operator is unable to pour the sand mixture into the model.

Percentage of said polyorganosilazane in the organic solution is not strictly limited, though with the use of lowconcentration solutions thereof durability of the final molds and cores is reduced due to the incorporation, into the molding sand mixture, of a large amount of an organic solvent which does not impart strength and, therefore, comprises "ballast". Furthermore, curing time of the molding sand mixture is increased. Highconcentration solutions of the polyorganosilazane have viscosity of about 150 cSt which hinders their use. It has been found that an optimal concentration of a solution of the polyorganosilazane is varied within the range of from 20 to 40%.

The best results are obtained with the following content of the ingredients in percent by weight:

| | |
|---|---|
| solution of hydrolyzed ethylsilicate | 15 to 25 |
| 20–40% solution of polyorganosilazane | 0.3 to 1.0 |
| filler | the balance. |

The present invention is further illustrated by the description of examples of the preparation of the molding sand mixture, reference being made to the accompanying drawings, wherein.

Preparation of the molding sand mixture according to the present invention may be performed by any conventional method for preparing a liquid molding sand mixture which generally comprises incorporation, into hydrolyzed ethylsilicate, of a filler and then a curing agent under continuous stirring.

Examples illustrating preparation of the molding sand mixture according to the present invention are given hereinbelow.

EXAMPLE 1

Preparation of a molding sand mixture for the manufacture of cores for steel castings of working wheels of centrifugal pumps Quartz sand and dust-like quartz are introduced into a solution of hydrolyzed ethylsilicate under stirring thereof with a stirrer rotating at the speed of 2,000 r.p.m. After homogenization of the mixture, a solution of a polyorganosilazane in toluene is added thereinto and stirring is continued for 1–2 minutes. For the preparation of the molding sand mixture, the following composition is used in percent by weight:

| | |
|---|---|
| quartz sand with fineness of 0.08 to 0.4 mm | 30.00 |
| dust-like quartz with fineness of 0.01–0.06 mm | 45.00 |
| solution of hydrolyzed ethylsilicate | 24.25 |
| 30% solution of polyorganosilazane in toluene | 0.75. |

The intermixed mixture is poured into the core box, wherein it is cured within 5 minutes. Then the solid core is put into a drier and placed, at normal temperature, into a liquid fixation medium for 2 to 6 hours. The core is then calcined at a temperature within the range of from 900° to 1,100° C. for 1–2 hours at a heating rate of from 100° to 150° C./hr As a result of these operations, the molding sand mixture has a bending strength of from 30 to 80 kg/cm².

EXAMPLE 2

Preparation of a molding sand mixture for castings from refractory alloys

The sequence of operations in the preparation of the molding sand mixture is the same as in Example 1 hereinbefore, though the following components are employed in percent by weight:

| | |
|---|---|
| Zirconium silicate with the fineness of 0.1–0.3 mm | 44.8 |
| Zirconium silicate with the fineness of 0.01–0.04 mm | 45.0 |
| Solution of hydrolyzed ethylsilicate | 10.0 |
| 20% solution of polyorganosilazane | 0.2. |

Curing time of the composition is 15–30 minutes. Bending strength after heat-treatment is 25–30 kg/cm².

EXAMPLE 3

Preparation of a molding sand mixture for small decorative castings from non-ferrous metals The sequence of operations is the same as in the foregoing Example 1.

The mixture components are taken in the following amounts in percent by weight:

| | |
|---|---|
| quartz sand with the fineness of 0.08–0.4 mm | 17.0 |
| dust-like quartz with the fineness of 0.01–0.06 mm | 24.0 |
| alumina with the fineness of 0.005–0.03 mm | 22.0 |
| solution of hydrolyzed ethylsilicate | 35.0 |
| 40% solution of polyorganosilazane | 2.0. |

Curing time of the resulting molding sand mixture is 0.8 to 1.5 minute. Bending strength after heat-treatment at the temperature of 800° C. is 15–20 kg/cm².

Figure 1A:
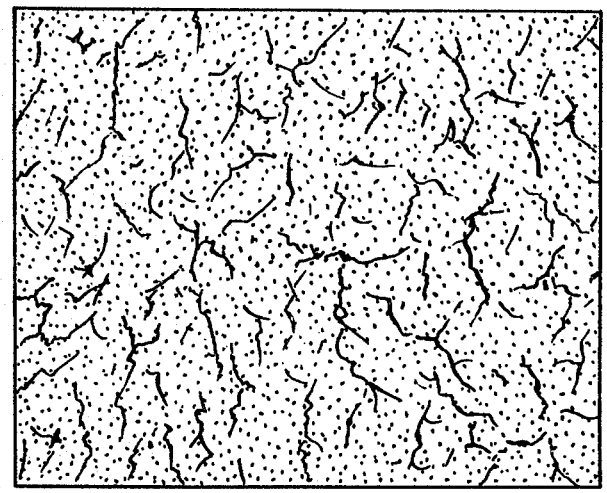
FIG. 1a shows the surface of the final core produced with the use of the prior art molding sand mixture, 5-fold magnification.
Figure 1B:
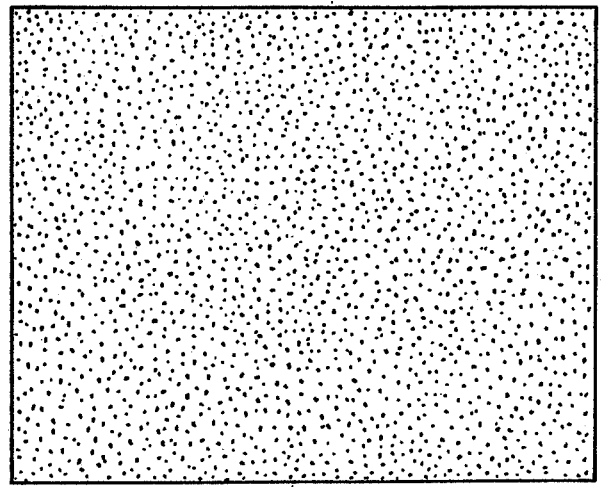
FIG. 1b shows the surface of the final core produced with the use of the molding sand mixture according to the present invention, 5-fold magnification.

The surface of the cured core produced from the molding sand mixture according to Example 3 has no developed cracks and features a very smooth surface (see FIG. 1b) which gives a high surface finish of castings. On the contrary, the surface of a core produced from the prior art molding sand mixtures is, as a rule, covered by a network of developed cracks (FIG. 1a) which impairs quality of the casting surface.

Given hereinabove are specific examples of preparation of the molding sand mixture illustrating the most preferable embodiments of the present invention and the method for the preparation of these molding sand mixtures. It is to be understood, that said Examples are merely illustrative and not limiting the scope and spirit of the present invention as defined by the following claims.

What is claimed is:

1. In molding sand mixtures for the manufacture of molds and cores and which comprise a filler, a binder in the form of a solution of hydrolyzed ethylsilicate and a curing agent to cause gelling of the solution of ethylsilicate, the improvement which comprises using as the curing agent an organic solution of a polyorganosilazane of the formula:

$$\{(R_2SiNH)_n[R'Si(NH)_{1.5}]_m\}_k,$$

wherein R is $CH_3$, R' is selected from the group consisting of $CH_3$ and $C_6H_5$, n=1, k=4, m=1–3, the filler, binder and curing agent being present in the following proportions in percent by weight:

| | |
|---|---|
| [solution of hydrolyzed ethylsilicate] binder | 10 to 35 |
| [organic solution of polyorganosilazane] curing agent | 0.2 to 2.0 |
| filler | the balance. |

2. In a molding sand mixture as claimed in claim 1, wherein said polyorganosilazane is used in the form of a 20–40% solution in an organic solvent.

3. In a molding sand mixture as claimed in claim 2, wherein said filler, binder and curing agent are used in the following proportions in percent by weight:

| | |
|---|---|
| binder | 15 to 25 |
| curing agent | 0.5 to 1.0 |
| | the balance. |

* * * * *